United States Patent
Brittain et al.

(10) Patent No.: US 6,684,396 B1
(45) Date of Patent: Jan. 27, 2004

(54) METHOD FOR UPGRADING RUNNING SOFTWARE PROCESSES WITHOUT COMPROMISING FAULT-TOLERANCE

(75) Inventors: Paul John Brittain, Chester (GB); Nicolas Peter Everard Weeds, Chester (GB)

(73) Assignee: Data Connection Limited, Enfield (GB)

( * ) Notice: Subject to any disclaimer, the term of this patent is extended or adjusted under 35 U.S.C. 154(b) by 492 days.

(21) Appl. No.: 09/645,537

(22) Filed: Aug. 25, 2000

(51) Int. Cl.[7] .................. G06F 9/44; G06F 11/00
(52) U.S. Cl. .................. 717/168; 714/11; 714/13; 707/204
(58) Field of Search ................ 717/168–171, 717/174–176; 714/1–13; 707/204

(56) References Cited

U.S. PATENT DOCUMENTS

| | | | | |
|---|---|---|---|---|
| 4,093,985 A | * | 6/1978 | Das ........................... | 714/5 |
| 4,941,087 A | * | 7/1990 | Kap ........................... | 710/260 |
| 4,954,941 A | | 9/1990 | Redman ..................... | 364/200 |
| 5,077,736 A | * | 12/1991 | Dunphy et al. ............. | 714/7 |
| 5,287,492 A | * | 2/1994 | Reynders ................... | 714/12 |
| 5,410,703 A | | 4/1995 | Nilsson et al. ............. | 395/700 |
| 5,751,574 A | | 5/1998 | Loebig ....................... | 364/187 |
| 5,761,518 A | * | 6/1998 | Boehling et al. ........... | 714/13 |
| 5,963,634 A | * | 10/1999 | Kantola et al. ............. | 714/12 |
| 6,157,932 A | * | 12/2000 | Klein et al. ................ | 707/204 |
| 6,195,760 B1 | * | 2/2001 | Chung et al. ............... | 714/4 |
| 6,421,741 B1 | * | 7/2002 | Minyard ..................... | 714/12 |
| 6,449,733 B1 | * | 9/2002 | Bartlett et al. ............. | 714/13 |
| 6,535,924 B1 | * | 3/2003 | Kwok et al. ................ | 709/242 |

FOREIGN PATENT DOCUMENTS

| GB | 2359385 A | * | 8/2001 | .......... G06F/9/445 |
|---|---|---|---|---|
| WO | WO 9602115 A2 | * | 1/1996 | .......... H04Q/3/545 |
| WO | WO 9603006 A2 | * | 2/1996 | .......... H04Q/3/545 |

* cited by examiner

Primary Examiner—Tuan Dam
Assistant Examiner—Eric B. Kiss

(57) ABSTRACT

When updating a running program in a system that uses a one-to-one backup program, fault-tolerance is lost while the backup program is itself being updated. To overcome this temporary loss of an available backup program, the number of backup copies of a software process is temporarily and dynamically increased during the software upgrade. The extra backup software processes may run on an unused processing unit or may run as an extra software process on a processing unit which is already performing a task. The technique may be applied to communication line cards.

20 Claims, 1 Drawing Sheet

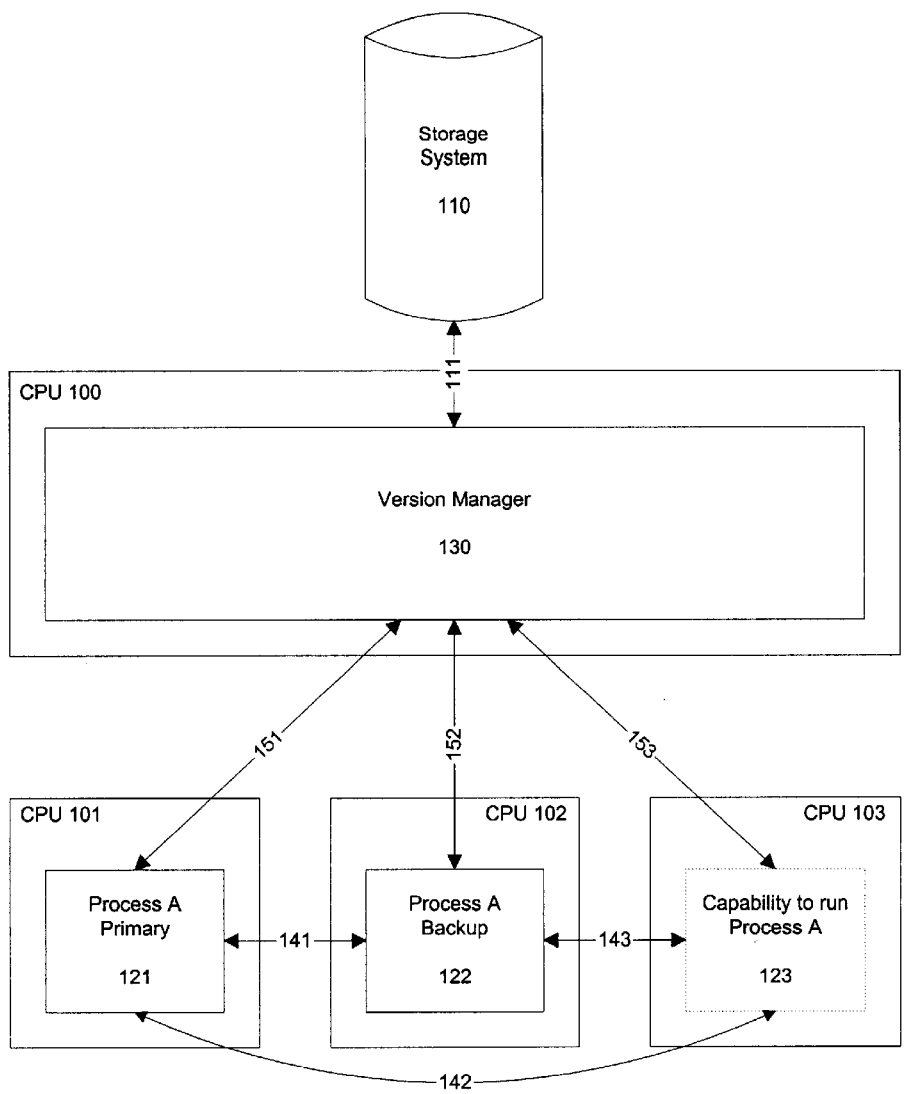
FIG. 1 Components of the Preferred Embodiment of a System for Upgrading a Software Process Without Compromising Fault-Tolerance

METHOD FOR UPGRADING RUNNING SOFTWARE PROCESSES WITHOUT COMPROMISING FAULT-TOLERANCE

BACKGROUND OF THE INVENTION

1. Field of the Invention

The present invention relates to the field of fault-tolerant computer systems. More specifically, the present invention relates to the problem of upgrading a running software process without reducing the level of failure protection provided by redundant copies of the software process during the upgrade. In particular, the present invention avoids introducing a single point of failure during the upgrade of fault-tolerant software that usually employs a single backup copy of the software to provide protection against failure of the primary copy during normal operation.

2. Description of Prior Art

Fault-tolerant computer systems use a variety of techniques to provide highly-available systems for use in safety-critical or mission-critical environments. Many systems use software fault-tolerance to provide redundant backup copies of a software process. One such copy is designated the primary copy of the software process and replicates its internal state to the backup copies so that one of the backup copies can take over as the primary copy if the primary copy fails.

A key feature of highly-available systems is to be able to replace the running version of a software process without interrupting the service provided by that software process. This can be achieved using software fault-tolerance. For example, if a system uses one backup copy and one primary copy, known as 1:1 redundancy, the upgrade can be achieved by stopping the backup copy of the software process and replacing it with the new version of the software, allowing it to synchronize with the primary copy, then forcing a failure of the primary copy in order that the new backup copy becomes the primary. A replacement for the old primary copy is then started using the new version of the software. Once this has synchronized with the (new) primary copy, the upgrade is complete and normal operation has been restored using the new version of the software.

However, this approach to software upgrade compromises the fault-tolerance of the system by introducing a single point of failure in the 1:1 redundancy case from the point when the original backup copy is stopped until the upgrade is complete. If a hardware or software fault is encountered during this time that causes the then primary copy of the software process to fail, there is no active and synchronized backup copy that can take over the function of the failed primary. This lack of failure protection may be unacceptable in some environments, such as telecommunications equipment.

The failure protection across an upgrade can be improved by running more than one backup copy, but this requires more system processor and memory resources for the additional backup copies and slows normal operation by requiring replication of internal state to more than one backup.

References

See U.S. Pat. No. 5,751,574, Loebig; U.S. Pat. No. 5,410,703, Nilsson et al.; and U.S. Pat. No. 4,954,941, Redman.

BRIEF SUMMARY OF THE INVENTION

The present invention avoids the reduction in failure protection during software upgrade of a redundant system by dynamically starting an additional backup copy of the new software version as the first step of the upgrade operation. This ensures that the failure protection during the upgrade operation is at least as good as that provided during normal operation. Though the present invention is of most use for 1:1 redundant systems, where failure protection is lost during the upgrade, it may also be applied to systems using more backup copies or, indeed, to a system where no backup copy is provided during normal operation but it is necessary to achieve software upgrades without impacting system operation.

The present invention has the following advantages over prior art:

The present invention does not compromise the fault-tolerance coverage provided for a software process while that software process is being upgraded to a replacement version.

The present invention does not require use of more than one backup copy of a software process during normal operation, which avoids the performance impact of replicating internal state to more than one backup during normal operation.

The present invention is not tied to any specific hardware or operating system and can be deployed in a heterogeneous distributed computer system.

BRIEF DESCRIPTION OF THE DRAWINGS

FIG. 1 shows the components of the preferred embodiment of a system that can upgrade a software process without compromising the degree of fault-tolerance provided for that process during the upgrade operation.

REFERENCE NUMERALS IN THE DRAWINGS

System Components:

100: A processing unit or CPU within a distributed computing system.
101: A processing unit or CPU within a distributed computing system.
102: A processing unit or CPU within a distributed computing system.
103: A processing unit or CPU within a distributed computing system.
110: A storage medium such as hard disk.
121: The copy of Process A running on CPU 101. This copy is currently the primary copy of A.
122: The copy of Process A running on CPU 102. This copy is currently the backup copy of A.
123: The copy of Process A running on CPU 103. This copy is currently not running.
130: The version manager software process that controls the upgrade operation.

Message Flows:

111: Loading of a specific version of a software process from 110
141: Replication of internal state between 121 and 122.
142: Replication of internal state between 121 and 123.
143: Replication of internal state between 122 and 123.
151: Control by 130 of software state of 121 and monitoring of replication status.
152: Control by 130 of software state of 122 and monitoring of replication status.
153: Control by 130 of software state of 123 and monitoring of replication status.

DETAILED DESCRIPTION OF THE INVENTION

This description covers a method for upgrading a running software process without compromising fault-tolerance. In the description, there are set forth, for purposes of explanation, many specific details, to provide the reader with a thorough understanding of the invention. It will be obvious to one skilled in the art that the invention may be practiced without these details. Furthermore, certain devices and orders of processing are given in the diagrams and the description, to make understanding the invention easier. It will, again, be apparent to one skilled in the art that the specific devices and sequences are merely illustrative and may be varied whilst remaining within the spirit and scope of the present invention.

DESCRIPTION OF THE PREFERRED EMBODIMENT

What follows is a description of the preferred embodiment of the present invention. Other possible embodiments will be discussed later.

With reference to FIG. 1, the preferred embodiment of a 1:1 redundant system that uses software fault-tolerance and that supports software upgrade without compromising fault-tolerance comprises the following components:

A plurality of processing units, shown as CPU 100 through CPU 103 in FIG. 1

A storage system, 110, such as a hard disk or flash memory, that can hold both the current version and replacement version of the software process to be upgraded.

A primary copy, 121, running on CPU 101 and a backup copy, 122, running on CPU 102, of Process A, the software process to be upgraded, both initially running the current copy of the software process.

Capacity in the system to run a third copy, 123, of the. Process A on CPU 103, though this is initially not running and hence is shown using dotted lines in FIG. 1.

A version manager software process, 130, running on CPU 100 that controls the upgrade of Process A to the replacement version and can load a version of Process A that it selects to be loaded from the storage system, 110, via interface 111 and cause this version to be loaded on a selected processing unit. In the preferred embodiment of the present system, this is achieved using operating system facilities to load a specified software process on a specified processing unit.

Capability for the primary copy of Process A, currently 121, to replicate internal state data to the backup copies of process A via message passing interfaces. Initially the only such interface in use is 141, which is used to replicate state to 122. If 123 were also running as a backup copy of Process A, 121 would use interface 142 to replicate internal state to 123. Similarly, if 123 were running as the primary, it would replicate internal state to 121 via 142 and to 122 via 143.

With reference to FIG. 1, the method used in the preferred embodiment of the present invention to achieve the replacement of Process A with a new version comprises the following steps:

The version manager, 130, starts the replacement version of Process A as 123 on CPU 103.

Once 123 has initialized and has received a replicated copy of the current state for Process A from 121, via 142, version manager, 130, forces a switch in the primary copy of Process A from 121 to 123. In the preferred embodiment, this is achieved by version manager sending a message to 121, via 151, telling it to cease to be the primary copy of Process A and informing 123, via a message on 153, that it should become the primary copy of process A.

Version manager, 130, selects a backup copy of Process A that is still running the old version of Process A and kills that backup copy. It then restarts the backup copy using the replacement version of Process A. This is repeated for each backup copy of Process A running at the old version until there is only one such backup copy remaining. In FIG. 1, when 123 has taken over as the primary copy of Process A, version manager, 130, restarts 121 using the replacement version of Process A. When 121 has re-initialized and has received a copy of the replicated state from 123, it is active as a backup copy of Process A. Note that if 123 fails before 121 has activated as a backup copy of Process A, 122 is still available as a backup copy so fault-tolerance of Process A has not been compromised by the upgrade operation.

Version manager, 130, kills the last old version backup copy of Process A without restarting a new copy. This restores the level of redundancy for Process A to the original number of backup copies that were running before the upgrade was started. In FIG. 1, 122 is the last backup copy and is killed by version manager, 130, leaving 123 as the primary copy of Process A and 121 as the backup copy thereof. The upgrade of Process A is now complete.

The method described above may be used for updating Process A to a newer version or to back-date it to a previous version provided that the method used for replication of internal state between primary and backup copies includes the capability to convert between the two versions of the internal state data representation. In both cases, the method described for the present invention is unchanged, though the conversion required is the opposite way around for upgrade to a new version versus downgrade to an earlier version.

DESCRIPTION OF ALTERNATIVE EMBODIMENTS

What follows is a description of some alternative embodiments of the present invention. One skilled in the art will easily be able to envisage other alternative embodiments of the invention.

It should be noted that the section titled "Detailed Description of the Invention" is simply a description of the preferred and some additional embodiments of the invention; the full scope of the invention is determined by the claims. A systems engineer skilled in the art of developing fault-tolerant distributed computing systems, based on the claims and the detailed description, should be able to implement a wide variety of systems for upgrading a running software process without compromising fault-tolerance that are significantly advanced compared with the current state of the art.

Distribution of System Components

The components of the preferred embodiment of the present invention can be instantiated in different forms according to the requirements and capabilities of the hardware and operating system. Some alternative embodiments include the following variations:

Copies of the process to be upgraded may run on one, or a plurality of processing units. In particular, it is not a requirement that each copy of the process executes on a separate CPU.

Version manager may execute on the same processing unit as one or more of the copies of the process to be upgraded.

Version manager may be incorporated as a library that executes within each software process rather than a specific separate software process.

The system may comprise a set of heterogeneous processing units with different capabilities, with different software processes running on each processing unit or type of processing unit. The present invention does not require that the processing units are all of the same type.

Fault tolerance of Version Manager

The version manager may itself be implemented as a fault-tolerant software process using redundancy and replication of internal state to provide fault-tolerant coverage. The present invention places no restrictions on the fault tolerance techniques or redundancy scheme used by version manager.

Redundancy Scheme for Process to be Upgraded

The preferred embodiment of the present invention uses 1:1 redundancy for the process to be upgraded, with one primary copy and one backup copy of that process running during normal operation. The present invention is not restricted to use with that redundancy scheme. Other possible schemes include the following variations:

The process to be upgraded may use no active backup copy during normal operation. In such cases the present invention could still be used to provide a seamless upgrade without taking the process out of service provided that the process to be upgraded is capable of replicating state to a backup copy.

The process to be upgraded may use more than one backup copy during normal operation, known as n:1 redundancy, where n is the number of backup copies employed. The present invention may still be used to preserve the level of fault tolerance during the upgrade of such a process, though this is of less benefit than the 1:1 redundancy case, which would otherwise have no fault-tolerance coverage during the upgrade.

In all these cases, the actual level of redundancy coverage in use at the time of the upgrade may be less than that normally desired if one or more copies of the software process has already failed at the time of the upgrade. For example, if a process uses 2:1 redundancy but one backup copy has already failed, the present invention can still be used to ensure that the level of fault-tolerance coverage is not further reduced by the upgrade operation.

Replication Method

The preferred embodiment of the present invention explicitly replicates the internal state of a software process from the primary copy to the backup copies using asynchronous message-based interfaces to replicate each change to the state separately to each backup copy. If a particular backup copy fails, or replication of a state change to a particular copy fails, the entire internal state is replicated to that backup copy when the backup is next accessible from the primary copy for the purpose of replicating state.

Alternative possible replication schemes include the following.

The primary copy may replicate the entire internal state on every message rather than each change.

The replication may employ a broadcast message-based scheme in order to avoid the primary copy having to replicate state explicitly to each backup copy.

Replication may use a shared storage medium in place of a message-based scheme, using either an explicit area of storage for each backup copy or allowing shared access to the same area of storage for all backup copies.

The replicated internal state may be kept in a persistent storage medium in order that it continues to be available even after the primary copy fails. A backup copy may read the internal state from this storage medium when it is requested to take over as the primary copy.

Replication may be embedded in the operating system such that the primary copy need only register what information should be copied to the backup copies but is thereafter unaware of the mechanisms used by the operating system to achieve this replication.

The method of replicating internal state may be chosen independently for each software process.

Optional use of Additional Backup Copy

The preferred embodiment of the present invention always uses this technique to avoid compromising fault-tolerance during a software upgrade. Some alternative embodiments may make use of this method optional according to one or more of the following criteria:

Static or dynamic configuration information available to the version manager. This configuration choice may be a system-wide option, a separate option for each software process, or a set of options that each apply to a group of one or more software processes.

Measurements on the current load presented to the system that allow the version manager to determine whether sufficient system resources are available to support execution of an additional copy of the software process to be upgraded for the duration of the upgrade operation. The criteria used to determine whether the system has sufficient resources may be set on a system-wide basis, independently for each software process, or per group of one or more software processes.

Options for the upgrade operation that are specified to the version manager when the upgrade is requested.

Method of Forcing Switch of Primary Copy

In the preferred embodiment of the present invention, version manager forces the switch of primary copy of the process to be upgraded using a message-based interface to the current primary copy and the additional backup copy to inform each copy of the new state that it should adopt.

Some alternative embodiments may simply kill the current primary copy instead of telling it to become a backup copy. In such cases, version manager must start an new backup copy to replace the killed primary copy of the process to be upgraded and allow this to receive a copy of the replicated internal state before embarking on the upgrade of the backup copies. This is required in order to preserve the degree of fault-tolerance.

Location of Additional Backup Copy

In the preferred embodiment of the present invention, version manager selects an unused processing unit as the location on which it starts the additional copy of the process to be upgraded. Some alternative embodiments may choose this location based on other criteria, including the following possible alternatives:

Static or dynamic configuration information that tells version manager on which processing units the process to be upgraded may execute and how many copies may execute simultaneously on each processing unit. For example, if the process to be upgraded is the support software for a particular communications line card, it may only be possible to run that process on such a line card rather than the main system CPU.

Measurements on the current load presented to the system to determine which processing units have sufficient free resources to run an additional copy of the process to be upgraded. The criteria used to determine whether a processing unit has sufficient resources may be set independently for each processing unit, independently for each software process, or per processing unit/process combination.

Some software processes may need to run on specific processing units for best performance during normal operation because, for example, this places the software process on the same processing unit as the majority of other software processes or hardware devices that it needs to access and therefore minimizes system bus traffic. In such cases, the version manager should start the additional backup copy on the preferred processing unit, if possible, so that the primary copy of the process to be upgraded can be executed on that processing unit when the switch over from the current primary copy (which may be running on the same processing unit) to the replacement version occurs as part of the upgrade operation.

Options specified to version manager for the upgrade operation may explicitly identify the location to be used for the additional backup copy.

Number of Additional Backup Copies Started

The preferred embodiment of the current system uses one additional backup copy during software upgrade in order to minimize the system resources needed during the upgrade operation. Some alternative embodiments may start more than one additional backup copy in order to be able to swap multiple copies of the process to be upgraded to the replacement version more quickly. This may speed the overall time taken to complete the upgrade on some systems, though at the expense of employing greater system resources during the upgrade operation.

Order of Upgrading Each Process

The preferred embodiment of the present invention randomly selects the next backup copy to be upgraded from the old version to the replacement version of the process to be upgraded. Some alternative embodiments may use different means for determining which backup copy to upgrade next, including the following possible techniques:

If a backup copy is already known to be out-of-date with respect to the current primary copy's internal state because, for example, the primary copy was unable to replicate a change to that backup copy, the version manager may choose to upgrade this backup copy ahead of other backup copies. This technique has the advantage that it avoids wasting the effort needed to resynchronize the internal state between this backup copy and the primary copy, which will be repeated as soon as the backup copy is upgraded to the replacement version of the process to be upgraded.

There may be performance advantages to upgrading the backup copies in a particular order. For example, it may be preferable to upgrade some processing units, which are less powerful than others, as soon as possible in order to minimize the processing load on these processing units for the conversion of the data representation of the internal state for the process to be upgraded while the primary and backup copies of this process are at different version levels.

We claim:

1. A method for upgrading a software process, running in a fault-tolerant computer system that comprises of at least one processing unit, with a replacement version of said software process without compromising the fault-tolerance coverage provided for said software process during the upgrade operation, said method comprising
   a. a first step of synchronizing the internal state of primary copy and a plurality of backup copies of said software process, each of which may be running on any of a subset of said processing units in said computer system
   b. a second step of storing at least the current version and said replacement version of said software process in at least one storage medium in said computer system
   c. a third step of controlling the version of said software process that is loaded when starting a copy of said software process and the processing unit on which said copy is to be started
   d. a fourth step of starting an additional backup copy of said software process in order to ensure that fault-tolerance coverage at least as good as that currently provided for said software process continues to be provided during said upgrade, said additional backup copy being started using said replacement version of said software process
   e. a fifth step of detecting when said additional backup copy of said software process has synchronized with the current primary copy of said software process
   f. a sixth step of forcing a change of state to make said additional backup copy the new primary copy of said software process
   g. a seventh step of upgrading each running backup copy of said software process with said replacement version thereof.

2. The method as set forth in claim 1, wherein said first step is achieved for a software process that does not require ongoing synchronization of internal state by passing identical configuration information to said primary and said backup copies when each copy is started.

3. The method as set forth in claim 1, wherein said first step is achieved by using an eighth step of replicating changes to said internal state from said primary copy to said backup copies, incorporating provision for conversion between version of said internal state if said primary copy and said backup copies are running different versions of said software process.

4. The method as set forth in claim 3, wherein said eighth step is achieved by explicitly replicating state from said primary copy to said backup copies via a message-based interface.

5. The method as set forth in claim 3, wherein said eighth step is achieved by replicating state from said primary copy to said backup copies via a shared storage medium.

6. The method as set forth in claim 1, wherein said second step is achieved by storing each version of said software process under a different name or location in said storage medium.

7. The method as set forth in claim 1, wherein said third step is achieved by specifying the name or location within said storage medium of said version of said software process to be loaded when a new copy of said software process is started, said name or location being specified independently for each request to start a copy of said software process.

8. The method as set forth in claim 1, wherein said fourth step is achieved by use of a specific software process, known as the version manager, which controls said upgrade operation and uses a ninth step for determining whether said additional backup copy should be started for said upgrade operation and on which processing unit said additional backup copy should be started, said additional copy being started by said version manager using said third step.

9. The method as set forth in claim 8, wherein said ninth step is achieved by said version manager monitoring the load currently presented to the system to identify the processing units that have capacity to run said additional backup copy.

10. The method as set forth in claim 8, wherein said ninth step is achieved by provision of static or dynamic configuration information accessible to said version manager that enables said version manager to determine the processing units on which said software process may run and how many copies of said software process may run concurrently on each processing unit on which said software process may run.

11. The method as set forth in claim 8, wherein said ninth step is achieved by said version manager choosing to start said additional backup copy on the processing unit that will minimize traffic on the system bus during said upgrade operation.

12. The method as set forth in claim 8, wherein said fifth step is achieved by said version manager using a message-based interface to said primary copy of said software process that enables said version manager to monitor the state of the synchronization between said primary copy and said backup copies, including said additional backup copy.

13. The method as set forth in claim 12, wherein said sixth step is achieved by said version manager killing said current primary copy and instructing said additional backup copy to become said new primary copy by means of a message-based interface between said version manager and said additional backup copy.

14. The method as set forth in claim 12, wherein said sixth step is achieved by said version manager instructing said current primary copy to become a backup copy of said software process and instructing said additional backup copy to become said new primary copy, said instructions being carried between version manager and the copies of said software process via a message-based interface.

15. The method as set forth in claim 13, wherein said seventh step is achieved by said version manager using a tenth step to select the next said running backup copy to upgrade and the processing unit on which to start a further copy of said replacement version of said software process, starting said further copy on said processing unit and allowing said further copy to synchronize said interal with said new primary copy then killing said running backup copy, except for the last running backup copy of said old version, which need only be stopped without starting said further copy in order to return the level of fault-tolerance coverage to that which existed before said upgrade began.

16. The method as set forth in claim 15, where in said tenth step is achieved by said version manager randomly selecting said running backup copy of said software process that said version manager will next upgrade to said replacement version and starting said further copy on the same processing unit as said running backup copy is running on.

17. The method as set forth in claim 15, wherein said tenth step is achieved by said version manager selecting said running backup copy of said software process that said version manager will next upgrade and the processing unit on which said further copy will be started using static or dynamic configuration information and knowledge of the current load on each processing unit to minimize the performance impact due to the processing load on the system for conversion of said internal state during said synchronization between said primary and said backup copies.

18. The method as set forth in claim 14, wherein said seventh step is achieved by said version manager using an eleventh step to select the next said running backup copy to upgrade and the processing unit on which to start a further copy of said replacement version of said software process, then stopping said running backup copy and starting said further copy and allowing said further copy to synchronize said internal state with said new primary copy before selecting the next said running backup copy to upgrade, except for the last running backup copy of said old version, which need only be stopped without starting said further copy in order to return the level of fault-tolerance coverage to that which existed before said upgrade began.

19. The method as set forth in claim 18, where in said eleventh step is achieved by said version manager randomly selecting said running backup copy of said software process that said version manager will next upgrade to said replacement version and starting said further copy in the same processing unit as said running backup copy is running on.

20. The method as set forth in claim 18, wherein said eleventh step is achieved by said version manager selecting said running backup copy that said version manager will next upgrade and the processing unit on which to start said further copy of said software process using static or dynamic configuration information and knowledge of the current load on each processing unit to minimize the performance impact due to the processing load on the system for conversion of said internal state during said synchronization between said primary and said backup copies.

* * * * *